United States Patent

Dahms et al.

[15] 3,637,430

[45] *Jan. 25, 1972

[54] CELLULOSIC SUBSTRATES IMPREGNATED WITH A CYCLOPENTADIENE DIMER SUBSTITUTED RESOLE

[72] Inventors: Ronald H. Dahms, Springfield; George J. Anderson, Wilbraham, both of Mass.

[73] Assignee: Monsanto Company, St. Louis, Mo.

[ * ] Notice: The portion of the term of this patent subsequent to Nov. 3, 1987, has been disclaimed.

[22] Filed: July 25, 1968

[21] Appl. No.: 747,498

[52] U.S. Cl. ............... 117/143 A, 117/132 BF, 117/138.8 A, 117/148.1, 117/55 L, 117/161 L, 161/259, 161/262, 161/264, 260/29.3, 260/32.8 R, 260/33.4 R, 260/33.6 R, 260/51 R, 260/53 R
[51] Int. Cl. ................. C08g 5/08, C08g 37/10, C08g 37/18
[58] Field of Search ..................... 260/57, 59, 53; 117/155 Z

[56] References Cited

UNITED STATES PATENTS

| | | | |
|---|---|---|---|
| 2,385,787 | 10/1945 | Bruson | 260/612 |
| 2,388,583 | 11/1945 | Ward | 260/619 |
| 2,423,415 | 7/1947 | Soday | 260/619 |
| 2,656,335 | 10/1953 | Bloch | 260/50 |
| 2,751,422 | 6/1956 | Nelson et al. | 260/666 |
| 2,824,860 | 2/1958 | Aldridge et al. | 260/82 |
| 2,831,821 | 4/1958 | Christenson | 260/17.2 |
| 2,864,868 | 12/1958 | Bader | 260/621 |
| 3,090,700 | 5/1963 | Ball et al. | 117/155 |
| 3,104,174 | 9/1963 | Harris | 117/155 X |
| 3,226,251 | 12/1965 | Norton et al. | 117/155 |
| 3,336,398 | 8/1967 | Booth | 260/619 |
| 3,420,915 | 1/1969 | Braithwaite | 260/837 |

*Primary Examiner*—Howard E. Schain
*Attorney*—John W. Klooster, Arthur E. Hoffman and Herbert B. Roberts

[57] ABSTRACT

Cellulosic substrates impregnated with a phenol-formaldehyde resin using a phenol which has been previously substituted with a specific mixture of cyclopentadiene codimers. The resulting impregnated sheets display an improved combination of properties including good tensile strength and flexibility, and are especially useful as filter media and as intermediates for the manufacture of laminates.

11 Claims, No Drawings

CELLULOSIC SUBSTRATES IMPREGNATED WITH A CYCLOPENTADIENE DIMER SUBSTITUTED RESOLE

BACKGROUND

In the art of impregnating cellulosic substrate members in a sheetlike form with phenolic resins, it has long been appreciated that phenol-formaldehyde resins tend to make impregnated cellulosic substrate members which, when impregnated with sufficient such resin to have acceptable strength, have strong tendencies to be brittle.

When such an impregnated substrate member is used to make filter media (for example, oil filters used with internal combustion engines, and the like), a so-impregnated substrate member is heated to a temperature sufficient to thermoset the resin and produce a porous, relatively stiff product. Unless there is a careful balance of properties in such a product, especially a suitable combination of porosity, tensile strength, and flexibility, the product filter medium is of low quality. For example, it may become brittle when exposed to hot motor oil.

Similarly, when such an impregnated substrate member is used to make laminates (for example, laminates for use as a circuit board or terminal board in electrical applications, or the like), so-impregnated substrate members are arranged into a multilayered configuration and thermoset together under heat and pressure to form a desired laminate. Here again, unless there is a careful balance of properties in such a laminate, especially a combination of good electrical properties and low water absorption, the product laminate is of poor quality. For example, it may tend to become dimensionally unstable and have poor electrical properties under humid conditions.

There has now been discovered a new and very useful class of resin-impregnated cellulosic substrates in which the impregnating resin is a certain substituted phenol-formaldehyde resole resin. Depending upon the type of cellulosic substrate employed, and upon the amount and particular type of such substituted phenol-formaldehyde resin employed, the product nonthermoset resin impregnated cellulosic substrates can be used as intermediates in a wide variety of articles of manufacture, such as filters, laminates, and the like. Usually, such intermediates are thermoset in making the final articles. The product articles generally and characteristically have an improved combination or balance of properties, including good tensile strength and flexibility. Particular articles can be prepared having improved filter characteristics and/or improved electrical characteristics.

SUMMARY

This invention is directed to resin-impregnated sheetlike forms comprising cellulosic substrates which are each impregnated with from about 5 to 70 weight percent (based on total weight) of at least one substituted phenol-formaldehyde resole resin.

The substituted phenol-formaldehyde resole resin employed in the products of this invention has a formaldehyde to phenol mol ratio of from about 0.8 to 2.0 (preferably from about 0.9 to 1.5), and is produced by reacting in the presence of a basic (preferably organic) catalyst under liquid aqueous phase conditions a certain substituted phenol mixture with formaldehyde. The resole resin used in this invention further has a relatively high molecular weight as shown by the fact that it is substantially water insoluble but has a methanol solubility such that a 60 weight percent solution thereof can be prepared in methanol. Such methanol solution characteristically has a viscosity not greater than about 5,000 centipoises, and preferably in the range from about 50 to 500 centipoises. In addition, this resin has a free formaldehyde content which is less than about 5 weight percent.

It will be appreciated that the aldehyde to phenol ratios herein described have reference to the total amount of phenol present before a reaction, including the phenol which is substituted.

The substituted phenol mixture used to make such resin is itself prepared by initially reacting phenol under Friedel-Crafts conditions with a mixture of cyclopentadiene codimers which comprises (when in a form substantially free of other materials wherein the sum of all component compounds of any given such mixture equals substantially 100 weight percent):

A. from about 50 to 99 weight percent of compounds each molecule of which has:
1. the dicyclopentadiene nucleus
2. from 10 through 13 carbon atoms
3. as nuclear substituents from zero through three methyl groups, and B. from about 1 to 50 weight percent of compounds each molecule of which is a codimer of cyclopentadiene with at least one acyclic conjugated alkadiene having from four through six carbon atoms per molecule.

In a preferred such mixture, a minor amount of cyclic and/or acyclic conjugated alkadiene is present, typically less than about 15 weight percent (same basis) and having five or six carbon atoms per molecule. Thus, such a mixture can comprise:

A'. from about 70 to 90 weight percent of dicyclopentadiene,
B'. from about 10 to 30 weight percent of compounds each molecule of which is a codimer of cyclopentadiene with at least one acyclic conjugated alkadiene having from four through six carbon atoms per molecule, and
C'. from about 2 to 15 weight percent of compounds each molecule of which is a cyclic and/or an acyclic conjugated alkadiene having 5 or 6 carbon atoms per molecule.

In another preferred such mixture, both a minor amount (less than about 10 weight percent—same basis) of compounds containing the indene nucleus, and a minor amount (less than about 15 weight percent—same basis) of compounds containing the phenyl vinylidene structure are present. Thus, such a mixture can comprise:

A''. from about 1.5 to 10 weight percent of compounds each molecule of which has:
1. the indene nucleus
2. from nine through 13 carbon atoms
3. as nuclear substituents from zero through four methyl groups B''. from about 50 to 70 weight percent of compounds each molecule of which has:
1. the dicyclopentadiene nucleus
2. from about 10 through 13 carbon atoms
3. as nuclear substituents from zero through three methyl groups, C''. from about 4 to 10 weight percent of compounds each molecule of which is a codimer of cyclopentadiene with at least one acyclic conjugated alkadiene having from four through six carbon atoms per molecule, and D''. from about 4 to 30 weight percent of compounds each molecule of which has:
1. a phenyl group substituted by a vinylidene group,
2. from eight through 13 carbon atoms
3. as substituents from zero through three groups selected from the class consisting of methyl and ethyl.

In still another preferred such mixture, there are controlled, minor amounts (from about 2 to 9 weight percent—same basis) of each of methylcyclopentadiene and codimers of cyclopentadiene with acyclic conjugated alkadienes relative to a major amount (from about 92 to 97 weight percent—same basis) of dicyclopentadiene. Thus such a mixture can comprise:

A'''. from about 92 to 97 weight percent of dicyclopentadiene,
B'''. from about 1 to 5 weight percent of compounds each molecule of which is a codimer of cyclopentadiene with at least one acyclic conjugated alkadiene having from four through six carbon atoms per molecule, and
C'''. from about 1 to 4 weight percent of compounds each molecule of which is a codimer of cyclopentadiene with a methylcyclopentadiene, provided that the sum of A''' and C''' in any given such cyclopentadiene dimer mixture is always at least about 95 weight percent, and preferably about 95 weight percent, thereof—same basis.

Preferably, such a mixture contains at least about 3 weight percent—same basis of B'''.

Examples of suitable such acyclic conjugated alkadienes (whether or not dimerized as specified above) include butadiene (a four carbon molecule used as specified above), piperylene, isoprene, 1,3-hexadiene, 1-methyl-1,3-pentadiene, and the like.

At the time when such a mixture is reacted with phenol as indicated, there can be present as diluents inert (e.g., as respects reactivity towards components of such mixture and phenol under Friedel-Crafts reaction conditions) organic compounds, such as aromatic and aliphatic hydrocarbons. While there is no apparent upper limit on the amount of diluent which may be present, it is preferred that the amount of diluent present range from about 5 to 50 weight percent (same basis).

By the phrase "when in a form substantially free of other materials" reference is had to a mixture (e.g., of starting materials, of product, or the like, as the case may be) which is substantially free (e.g., on an analytical or theoretical basis) of substances (like inerts) as respects reactivity with phenol under Friedel-Crafts catalysis) other than such mixture itself. For example, the aforeindicated starting mixture of diene codimers could have an inert hydrocarbon diluent admixed therewith such as benzene, lower alkyl substituted benzenes, naphthalenes and alkane hydrocarbons containing from six through ten carbon atoms per molecule.

The term "cyclopentadiene" as used herein refers to the cyclic compound having the structure:

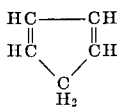

The term "dicyclopentadiene" as used herein refers to the cyclic compound having the structure:

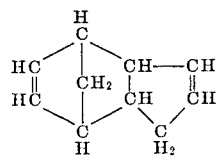

The term "vinylidene" as used herein has generic reference both to vinylidene radicals

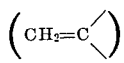

and vinyl radicals (CH$_2$ = CH— or —CH =CH—); observe that in carbocyclic compound mixtures used in this invention having a phenyl group substituted by a vinylidene group, alpha-methyl substitution is included in this definition, as well as styrene, methyl styrene, and ethyl styrene.

All solids herein are conveniently measured using ASTM Test Procedure No. D-115-55.

Such a starting material diene codimer compound mixture can be prepared synthetically or derived by suitable preparative procedures from naturally occurring crude petroleum, as those skilled in the art will appreciate. A preferred mixture of such diene codimer compounds for use in this invention is a petroleum derived blend of components having diluents already incorporated thereinto. For example, suitable such mixtures are shown in the following tables I–III. In table I is shown an example of such a mixture available commercially under the trade designation "Dicyclopentadiene Concentrate" from the Monsanto Company, St. Louis, Mo.; in table II, one available commercially under the trade designation "Resin Former P" from Hess Oil and Chemical Co. of New York, N.Y. and in table III, one available commercially under the trade designation "Dicyclopentadiene" from Union Carbide Company, New York, N.Y. and also one available commercially under the trade designation "Dicyclopentadiene" from Eastman Kodak Company, Rochester, N.Y.

TABLE I

| Component[1] | Total est. wt. %[2] | Adjusted rel. Approx. wt.[5] |
|---|---|---|
| A. Dicyclopentadiene Compounds | | |
| 1. Dicyclopentadiene | 72.1 | 77.1 |
| 2. Codimers of cyclopentadiene and methylcyclopentadiene | 0.4 | 0.4 |
| B. Cyclopentadiene/Alkadiene Codimers (Codimers of cyclopentadiene and acyclic conjugated alkadienes containing from four through six carbon atoms per molecule[3]) | 18.6 | 19.8 |
| C. Conjugated Alkadienes (Cyclic and acyclic conjugated alkadienes containing five and six carbon atoms per molecule[4]) | 2.2 | 2.3 |
| D. Alkenes | | |
| 1. Cyclopentene | 0.4 | 0.4 |
| Total of (A), (B), (C), and (D) | 93.7 | 100.0 |
| E. Inert Hydrocarbon Diluents (Total) | 6.3 | |
| 1. Benzene | 0.9 | |
| 2. methylcyclopentane, and hexane | 5.4 | |

[1]Data in table 1 derived from vapor-liquid-phase chromatography and mass spectrography.

[2]Based on total weight of diene dimer compounds and other components including diluents.

[3]These alkadienes are usually piperylene and isoprene; composition of such alkadienes is somewhat variable.

[4]These alkadienes are usually piperylene, isoprene and cyclopentadiene; composition of such alkadienes is somewhat variable.

[5]Diene codimer compound mixture when in a form substantially free of other materials wherein the sum of all component compounds in any given such mixture equals substantially 100 weight percent.

TABLE II

| Component | Total Weight % Basis[1] | | Weight % Diene Codimer Mixture Components only[2] | |
|---|---|---|---|---|
| Arylcycloalkenes | | 1.7 | | 1.9 |
| Indene | 1.7 | | 1.9 | |
| Dicyclopentadienes | | 65.5 | | 74.1 |
| Dicyclopentadiene | 48.9 | | 55.3 | |
| Methyldicyclopentadiene | 15.2 | | 17.2 | |
| Dimethyldicyclopentadiene | 1.4 | | 1.6 | |
| Cyclopentadiene/alkadiene Codimers | | 8.0 | | 9.1 |
| Codimers of cyclopentadiene with acyclic conjugated alkadienes having from four through six carbon atoms per molecule | | | | |
| Codimer with butadiene | 6.0 | | 6.8 | |
| Codimer with isoprene | 2.0 | | 2.3 | |
| Arylalkenes | | 6.9 | | 7.7 |
| Styrene | 5.6 | | 6.3 | |
| Alphamethylstyrene | 1.3 | | 1.4 | |
| Trimers incorporating cyclopentadiene, methylcyclopentadiene or conjugated alkadienes having from four through six carbon atoms per molecule | | 6.4 | | 7.2 |
| Diene Codimer Mixture Subtotal | | 88.5 | | 100.0 |

| Unidentified Components | 9.4 | Inert diluents |
|---|---|---|
| Benzene | 0.1 | |
| Toluene | 3.7 | |
| Xylene and ethylbenzene | 5.1 | |
| Naphthalene | 0.5 | |

[1] These values derived using a combination of vapor liquid phase chromatography and mass spectrometry.

[2] When in a form substantially free of other materials wherein the sum of all component compounds of any given such mixture equals substantially 100 weight percent.

TABLE III

| component | Union Carbide (wt. %) | Eastman Kodak (wt. %)[1] |
|---|---|---|
| Dicyclopentadienes | 93.2 | 95.6 |
| Methyldicyclopentadienes | 3.0 | 0.9 |
| Cyclopentadiene/acyclic conjugated diene codimers | 2.5 | 1.9 |
| Heavy ends[2] | 0.2 | 0.6 |
| Unidentified | 1.1 | 1.0 |

[1] These values derived using a combination of vapor liquid phase chromatography and mass spectrometry.

[2] Heavy ends here comprise primarily trimers of such components as cyclopentadiene, methylcyclopentadiene, and conjugated alkadienes containing from four through six carbon atoms per molecule. Typically, these heavy ends are reactive with phenol under Friedel-Crafts conditions as taught herein.

To react phenol with such an aforedescribed cyclopentadiene codimer mixture, it is convenient to use Friedel-Crafts conditions, as indicated.

The term "Friedel-Crafts conditions" as used herein refers to the conventional conditions known to those of ordinary skill in the art used for the alkylating or arylating of hydrocarbons (including phenol) by the catalytic action of aluminum chloride or equivalent catalyst in the presence of appropriate heat and pressure. Conveniently, the phenol and suitable Friedel-Crafts acid catalyst are mixed, brought to the proper temperature and the diene codimer compound mixture metered into the acidified (or catalyzed) phenol.

For purposes of this invention, the reaction of diene codimer compound mixture with phenol is preferably carried out at temperatures in the range of from about 25° to 200° C., although higher and lower temperatures can be used. Also, the reaction is preferably conducted under liquid phase conditions at or below atmospheric pressures although superatmospheric pressures can be used. Inert hydrocarbons, as indicated above, generally facilitate the process. Such inert hydrocarbons can be readily removed, such as by vacuum stripping, at the completion of the reaction if desired. Especially when stripping is contemplated, the most preferred inert hydrocarbons having boiling points between about 70° and 140° C. The progress of the reaction can be monitored, if desired, by measuring the quantity remaining of unreacted diene codimer compound using, for example, vapor phase chromotography.

Friedel-Crafts catalysts which may be used in place of aluminum chloride, or together with aluminum chloride, include:

A. other inorganic halides, such as gallium, titanium, antimony and zinc halides (including $Z_nCL_2$);
B. inorganic acids, such as sulfuric, phosphoric and the hydrogen halides (including H F);
C. activated clays, silica gel alumina, and the like;
D. $BF_3$ and $BF_3$ organic complexes including complexes of $BF_3$ with organic compounds, such as ethanol, butanol, glycol, phenol, cresol, anisole, ethyl ether, isopropyl ether, di-n-butyl ether, formic acid, acetic acid, and propionic acid, or with inorganic acids, such as phosphoric acid, sulfuric acid, and the like; and
E. alkyl, aryl and aralkyl sulfonic acids, such as ethane-sulfonic acid benzene sulfonic acid, benzene disulfonic acid, chlorobenzene sulfonic acid, 3,4-dichlorobenzene sulfonic acid, cresol sulfonic acids, phenol sulfonic acids, toluene sulfonic acids, xylene sulfonic acids, octylphenol sulfonic acid, β-naphthalene sulfonic acid, 1-naphthol-4-sulfonic acid, and the like.

When $BF_3$, as such, is employed, it is conveniently fed to a reaction mixture in gaseous form. While any combination of diene codimer compound starting mixture, phenol and catalyst can be used, it is particularly convenient to react for each 100 parts by weight of phenol about 10 to 100 by weight parts of such diene codimer compound mixture (on a 100 weight percent basis in a form substantially free of other materials) in the presence of less than about 10 weight percent (based on the phenol) of acid catalyst.

The reaction mass is then heated to a temperature in the range of from about 25° to 200° C. The rate of this reaction is dependent, to some degree, on the temperature employed. In general, the reaction is rapid, and a complete reaction between phenol and diene codimer compound mixture is preferred. Suitable process variables are summarized in table IV below.

TABLE IV

| Process variable | Broad range | Preferred range |
|---|---|---|
| Temperature | About 25 to 200° C. | About 70 to 125° C. |
| Reaction time | Less than about 4 hours. | About 10 to 30 minutes. |
| Catalyst (based on phenol) | Less than about 10 weight percent. | About 0.1 to 1.0 weight percent. |
| Inert hydrocarbon content (based on total weight diene codimer compound mixture and diluent). | Up to about 50 weight percent. | About 2 to 10 weight percent. |
| Total diene codimer compound mixture[1] (based on 100 parts by weight phenol). | About 10 to 100 parts by weight. | About 20 to 70 parts by weight. |

[1] On a 100 weight percent basis in a form substantially free of other materials.

In general, to produce a resole phenol-formaldehyde resin for use in this invention from a substituted phenol product prepared as just described, such product is neutralized under aqueous liquid phase conditions as by the addition of base, and then from about 0.8 to 2.0 moles of formaldehyde per one mole of (starting) phenol is mixed with the substituted phenol product (now itself a starting material). Also a basic catalyst material such as hexamethylenetetramine, ammonium hydroxide, triethylamine, sodium hydroxide, mixtures thereof, and the like, is introduced into the reaction mixture. The pH of this reaction mixture using such basic catalyst is maintained about 7.0.

It will be appreciated that the formaldehyde to phenol ratios herein described have reference to the total amount of phenol present before a reaction, including the phenol which is substituted by the diene codimer compound mixture, as described above. Aqueous liquid phase preparation conditions are generally but not necessarily used.

To optimize electrical properties in such resole products it is preferred to use as a basic catalyst, when reacting such substituted phenols with formaldehyde, one which is organic (substantially nonionic) in character, such as triethylamine, or the like. Suitable process variables for making such resole are summarized in table V below:

TABLE V

| Process variable | Broad range | Preferred range |
|---|---|---|
| Formaldehyde/phenol mol ratio. | About 0.8-2.0 | About 1.0-1.5. |
| Catalyst parts by weight (based on 100 parts by weight total phenol after neutralization of starting phenol). | About 0.1-10 | About 0.5-4. |
| pH | Above about 7.0 | About 7.5-8.5. |
| Temperature | About 60° C. to reflux. | About 80° C. to reflux. |
| Reaction time | Under about 4 hours. | About 20-120 min. |

The resole product produced by reacting the substituted phenol with aldehyde as described above is one composed of methylolated substituted phenol which has been methylolated by the formaldehyde to a desired methylol content and optionally advanced (e.g., the molecular weight of the methylolated substituted phenol increased) as by heating as necessary or desirable to make a resole product having characteristics generally as described above. Such a resole can be regarded as being the reaction product of the above-described substituted phenol mixture and formaldehyde under aqueous base catalyzed conditions as described which product can be thermoset by heat alone without the use of a curing catalyst. In general, however, such resole product as made is a brown colored, unstable, multiphase aqueous emulsion whose viscosity depends, in any given instance, upon process and reactant variables but which usually ranges from a syrupy liquid to a semisolid state. A resole product derived from such aqueous phase as a brown colored material whose viscosity varies from a syrup to a solid. Such emulsion is preferably dehydrated and formed into a varnish for use in making the impregnated sheet products of this invention.

Thus, when such emulsion is dehydrated under heat and reduced pressure to a water content generally under about 15 weight percent but over about 2 weight percent, there is produced a single-phased, clear, resole resin in the physical form usually of a high solids viscous dark fluid. In any given instance, its total solids content, (residual) water content, and viscosity depend upon the amount of substituted phenol aldehyde product present, the mole ratio of aldehyde to substituted phenol, type and amount of methylolation catalyst, conditions and reactants used to substitute the phenol, methylolation temperature, degree of advancement, and the like.

When such a dehydrated liquid resole is further dehydrated to a water content under about 2 weight percent, there is produced a solid, so-called "one-stage lump resin" which consists substantially of pure resin. Usually the water content after such a dehydration is not less than about 0.5 weight percent of the product resin, in general.

Suitable resole dehydration conditions typically involve the use of a vacuum ranging from about 25 to 28 inches Hg and temperature ranging from about 40° to 90° C. Higher and lower temperatures and pressures can be employed, as those skilled in the art appreciate.

To prepare a varnish from a dehydrated resole product as described above, such resole is then conveniently dissolved in a relatively volatile, inert organic solvent medium having properties generally as defined above. It is not necessary, and it is preferred not, to prepare the resole resin in the form of a solid before dissolution thereof in organic solvent. In general, the water content of the partially dehydrated resole material is controlled so that the water content of the solution of resole resin in such solvent medium (the varnish) is below about 15 weight percent (based on total weight).

While the organic liquid used has properties as indicated above, it will be appreciated that such liquid can comprise mixtures of different organic liquids. Preferred liquids are lower alkanols (such as ethanol and methanol) and lower alkanones (such as acetone or methyl ethyl ketone). The term "lower" refers to less than seven carbon atoms per molecule as used herein. Aromatic and aliphatic (including cycloaliphatic) hydrocarbons can also be employed as solvents for a given resin, including benzene, toluene, xylene, naphthalene, nonone, octane, petroleum fractions, etc. Preferably, the total water content of a varnish of the invention is below about 10 weight percent, and more preferably falls in the range of from about 0.5 to 5 weight percent.

Those skilled in the art will appreciate that care should preferably be taken when using this procedure to use an organic liquid system in which the phenolic resole resins are completely soluble as well as any water present. Adding, for example, a ketone or an ether solvent like butyl cellosolve generally improves the water tolerance (ability to dissolve water) of a solvent system.

The varnishes thus made typically comprise:
A. from about 20 to 75 weight percent of the above-described substituted phenol-formaldehyde resole resin,
B. from about 0.5 to 15 weight percent of dissolved water, and
C. the balance up to 100 weight percent of any given varnish being an organic liquid which:
 1. is substantially inert (as respects such resin mixture),
 2. boils (evaporates) below about 150° C. at atmospheric pressures,
 3. is a mutual solvent for such resin and for such water (if present).

These varnishes are characteristically dark colored, one-phase, clear liquid solutions having a viscosity ranging from about 5 to 5,000 centipoises, the exact viscosity of a given varnish depending upon chemical process and product variables used in manufacture. For impregnating applications, viscosities of from about 50 to 500 centipoises are preferred.

The total solids content of a given varnish product can be as high as about 85 weight percent or even higher and as low as about 20 weight percent or even lower, but preferred solids contents usually fall in the range of from about 25 to 65 weight percent.

In general, an individual cellulosic substrate used in the present invention as in a preformed sheetlike condition and need have no special characteristics. It can be composed of cellulosic fibers which optionally can contain up to about 50 weight percent of a synthetic organic polymeric fibrous material, such as a polyester, a polyimide, a vinylidene chloride polymer, and an acrylonitrile/vinyl chloride copolymer, mixtures thereof, and the like. Typical thicknesses range from about 3 to 30 mils (under about 10 preferred). The cellulosic substrate, whether or not modified with such a polymeric fibrous material is preferably in an integral, uniform, woven or nonwoven, sheetlike condition. Preferably, individual substrate members are composed substantially of cellulose. The cellulosic fibers used in such a substrate member can be of natural or synthetic origin. Typical well-known sources for cellulose fibers include wood, cotton, and the like. Typically, and preferably, average fibers used in substrates employed in this invention have length to width ratios of at least about 2:1, and more preferably about 6:1, with maximum length to width ratios being variable.

The term "substantially" as used herein in reference to cellulosic substrates has reference to the fact that such a substrate comprises mainly cellulose fibers with not more than about 5 to 10 percent of any given cellulosic substrate being other components, such as nonfibrous fillers, diluents, and the like, or fibrous noncellulosic materials, such as those derived from organic sources, (e.g., protein, synthetic polymers like polyesters, etc.), or inorganic sources (e.g., silicious fibers or metallic fibers). Such other components when and if present characteristically have size ranges which are not greater in magnitude than the cellulosic fibers. Preferably, such other components are under 1 weight percent of the total weight of a starting individual cellulosic substrate member.

Particularly when high electrical properties are desired in a product laminate of the invention, the cellulosic substrate member should have a low ash content. Ash contents under 1 weight percent (based on total cellulosic substrate member weight) are preferred, and those having ash contents under 0.5 weight percent are more preferred.

When the impregnated cellulosic sheetlike products of this invention are to be used, for example, as battery separators, one class of preferred cellulosic nonwoven fibrous permeable structures have a Gurley porosity of about 1–25 seconds when using a 5 oz. cylinder and a ¼ square inch orifice.

Before a liquid resole resin composition such as described above is used for impregnation of a preformed cellulosic substrate, it is convenient to dilute such composition with an organic liquid (as described above) so that the total solids concentration of such resulting composition typically ranges from about 5 to 40 weight percent (as indicated), with solids contents of 10 to 30 percent being preferred. A primary reason for impregnating with such an organic liquid is to permit one to impregnate a preformed cellulosic substrate such as paper without causing a deterioration in the wet strength thereof. By using an organic liquid system as described, the wet strength of a preformed cellulosic substrate material after impregnation and before drying to remove volatile liquid is maintained at convenient processing levels for subsequent drying, advancing, etc., by machines, etc.

In general, impregnation of a preformed substrate cellulosic member by such a resole composition can be accomplished by any conventional means, including spraying, dipping, coating, or the like, after which it is convenient and preferred to dry the so-treated sheet to remove residual volatile components and thereby leave a desired impregnated sheetlike construction. In drying, care is used to prevent leaving excessive volatile material in the impregnated sheet. In general, a volatile level of less than about 8 percent by weight is preferred.

For purpose of this invention, volatile level is conveniently determined by loss in weight after 10 minutes at 160° C. of a sample impregnated sheet. A so-impregnated sheet member generally contains from about 5 to 70 weight percent of solids derived from the substituted phenol-formaldehyde resole.

A preferred sheetlike product of this invention which is to be subsequently used in the manufacture of cellulosic laminates is advanced to an extent such that it has a flow of from about 3 to 20 percent (preferably from about 5 to 15 percent). To so advance a sheet member to such a flow it is convenient to heat in air such an intermediate sheet to temperatures in the range of from about 30° to 180° C. for a time sufficient to advance same to the so-desired extent. It will be appreciated that such an advancement can be conveniently accomplished while residual volatile materials are being removed in a drying operation after impregnation, as indicated above.

Intermediate sheetlike members of this invention, whether advanced to the extent indicated or not, are generally at least about 4-mils thick and can be as thick as 20 mils, though thicknesses not more than about 10 mils are preferred.

The density of an individual impregnated sheetlike product is relatively unimportant since the laminate, as described below, is formed under heat and pressure conditions which generally solidify all components together into an integral, solid, nonporous, thermoset mass.

To make a laminate construction from an impregnated sheet member of this invention one forms at least one such sheet member (preferably advanced as described above) into a layered configuration which is at least two layers thick with adjoining layers being substantially in face-to-face engagement. As those skilled in the art will appreciate, an individual laminate construction of the invention can comprise a series of different impregnated cellulosic substrate members at least one of which is an intermediate sheetlike member of this invention or it can comprise a series of similar such intermediate members depending upon properties desired in the product laminate.

Such a layered configuration is then subjected to pressure in the range of from about 50 to 2,000 p.s.i. while maintaining temperatures in the range of from about 120° to 180° C. for a time sufficient to substantially completely thermoset the composite and thereby produce a desired laminate. Preferably the laminate is pressed at about 140° to 160° C. at about 500 to 1,500 p.s.i. for about 15 to 60 minutes. It is preferred to use sheet members of this invention as the sole components for laminates of this invention.

To make a battery separator from an impregnated sheet member of this invention one can initially treat a preformed fibrous nonwoven cellulosic sheet with a liquid resole resin composition as described above by either the wet-web saturation method or the dry-web method. In either method, it may be desirable to dilute the resin composition in order to obtain the desired pickup. The impregnated cellulosic sheet is dried to remove excess solvent. This product sheet is then subjected to a temperature of about 200° F. to about 600° F. in order to cure the phenol-aldehyde resin to an infusible substantially completely thermoset state. The time of exposure of the treated cellulosic fibrous sheet to these temperatures will vary from approximately 30 minutes at 200° F. to at least 1 minute at 600° F. In addition, the cellulosic fibrous battery separator is generally ribbed to increase its resistance to degradation during use thereof in a lead-acid battery. Generally, it is also desirable to impregnate the cellulosic fibrous sheet with about 20–50 weight percent of the resin composition of this invention.

Alternatively, the cellulosic fibrous sheet may be first treated with the phenol-aldehyde resin alone, and secondly, in a separate operation, treating the cellulosic fibrous sheet with the surface active agent either before or after subjecting the phenolaldehyde treated fibrous sheet to the elevated temperatures.

The resole varnishes of this invention are useful in the manufacture of automotive oil filters. The cellulosic substrate employed in such filters is typically a cellulose fiber nonwoven paper modified with from about 1–50 weight percent of a synthetic organic fiber (such as a polyester or the like) and having a sheet thickness of from about 5 to 20 mils. Such a sheet is impregnated with sufficient resole varnish resin (as described above) according to this invention to obtain an impregnated sheet member having a resin content of about 15 to 25 percent, based on the weight of the total weight of the impregnated substrate. After the substrate is impregnated, it is heated to advance the resin to a B-stage (advance the resin but not gel it) and then is conventionally corrugated or pleated (as those skilled in the art appreciate) to form the filter element. The filter element is then typically assembled into a filter container and heated to 250° to 350° F. for from 5 to 20 minutes to cure the resin. The filter can be cured before such assembly. When cured, the product filter has good flexibility and good resistance to embrittlement after immersion in hot motor oil. Further, the B-staged impregnated paper has good tensile strength yet is flexible enough for processing into filter elements.

In general, to thermoset (cure) a cellulosic substrate impregnated with a substituted phenol-formaldehyde resin in accordance with the teachings of this invention, one conveniently heats the so-impregnated structure to a temperature ranging from about 200° to 350° F. for a time of from about 1 to 45 minutes, though lower and higher times and temperatures can be used.

EMBODIMENTS

The following additional examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Examples of liquid-treating compositions (termed varnishes herein) suitable for use in making impregnated sheet members of this invention are prepared as follows: The substituted phenol-formaldehyde resole resin produced as described and employed in each varnish described has a formaldehyde to phenol ratio of from about 0.9 to 1.5. Each is produced by reacting in the presence of an organic basic catalyst under liquid aqueous phase conditions a substituted phenol mixture with formaldehyde. Each is substantially water insoluble, but has a methanol solubility such that a 60 weight percent solution thereof can be prepared in methanol. Each such methanol solution characteristically has a viscosity in the range from about 50 to 500 centipoises. Each resin has a free formaldehyde content which is less than about 5 weight percent.

Examples of substituted phenols made with one preferred starting mixture used in this invention and resoles made therefrom are given below:

EXAMPLE A'

To a stirred reaction vessel 100 parts of phenol and 0.5 part concentrated sulfuric acid are charged and the resulting mixture is heated to 125° C. Then 25 parts of a diene codimer compound mixture available commercially under the trade designation "Dicyclopentadiene Concentrate" from Monsanto Company and having a composition as described above in table I are added to this phenol mixture over a 30-minute period, keeping the temperature between 125° and 135° C. After the addition, the mixture temperature is held at 125° to 135° C. for 15 minutes. The product is a substituted phenol mixture.

EXAMPLES B' to I'

Using the procedure and raw materials described in example A', additional substituted phenol mixtures are prepared, as shown in table VI below:

TABLE VI

| Ex. No. | Friedel-Crafts catalyst | Parts per 100 phenol | Diene codimer mixture, parts per 100 phenol | Reaction temperature, °C. | Post reaction holding period, min. |
| --- | --- | --- | --- | --- | --- |
| B' | $H_2SO_4$ | 0.5 | 20 | 125 | 15 |
| C' | $H_2SO_4$ | 0.5 | 45 | 125 | 30 |
| D' | $H_2SO_4$ | 0.5 | 55 | 125 | 30 |
| E' | $H_2SO_4$ | 1.0 | 65 | 150 | 30 |
| F' | $BF_3$-etherate | 0.5 | 35 | 70 | 60 |
| G' | $BF_3$-etherate | 0.5 | 55 | 90 | 30 |
| H' | $AlCl_3$ | 1.0 | 35 | 125 | 30 |
| I' | $BF_3$-etherate | 0.5 | 70 | 150 | 60 |

EXAMPLE 1'

To the substituted phenol mixture made in example A' is added (per 100 parts of phenol) 2 parts triethylamine, 2 parts hexamethylenetetramine and 83 parts of 50 percent formalin. This mixture is heated to a 100° C. reflux for 55 minutes, then cooled to 50° C. to produce a resole resin which is then dehydrated to 60° C. and 26 inches Hg. When this temperature is reached, 80 parts methanol are added and the solution cooled. The product varnish is clear and thermally cures to give a clear film on a heated steel surface. The varnish has 60.3 percent solids and an Ostwald viscosity of 98 centipoises.

EXAMPLE 2'

To the substituted phenol mixture made in example D' is added (per 100 parts of phenol) 2 parts of triethylamine, 3 parts of hexamethylenetetramine and 60 parts of 50 percent formalin. The mixture is heated to a 100° C. reflux for 50 minutes, then cooled to 50° C. to produce a resole resin which is then dehydrated to 60° C. and 27 inches Hg. When this temperature is reached 70 parts methanol and 10 parts methyl ethyl ketone are added. A clear varnish is obtained which thermally cures to give a clear film on a heated steel surface.

EXAMPLES 3' to 9'

Examples of other varnishes of this invention are summarized in table VII. Preparation procedure for each is as given in example 1'. In each instance, a clear varnish is obtained which thermally cures to give a clear film.

TABLE VII

| Ex. No. | Substituted Phenol Ex. No. | Resole Preparation Method, Ex. No. |
| --- | --- | --- |
| 3' | B' | 1' |
| 4' | C' | 2' |
| 5' | E' | 2' |
| 6' | F' | 1' |
| 7' | G' | 2' |
| 8' | H' | 1' |
| 9' | I' | 2' |

EXAMPLE 10'

To a stirred reaction vessel 100 parts of phenol and 0.5 part concentrated sulfuric acid are charged and the resulting mixture is heated to about 125° C. Then 30 parts of a diene codimer mixture are added to the phenol mixture over a 30-minute period, keeping the temperature between 125° and 135° C. This diene codimer compound mixture comprises, when in a form substantially free of other materials wherein the sum of all component compounds of any given such mixture equals substantially 100 weight percent, about 70 weight percent dicyclopentadiene, about 28 weight percent of codimers of cyclopentadiene with butadiene and isoprene (50/50) and about 2 weight percent of 50/50 1-pentene and 1-hexene mix. This diene codimer mixture additionally contains about 10 weight percent toluene as an inert diluent. After the addition, the product mixture is held at 125° to 135° C. for about 15 minutes.

To this substituted phenol product mixture is then added (per 100 parts of phenol) 2 parts triethylamine, 2 parts by weight hexamethylenetetramine and 83 parts by weight of 50 percent formalin. This mixture is heated to a 100° C. reflux for about 55 minutes, then cooled to 50° C. to produce a resole resin which is then dehydrated under vacuum to 60° C. and 26 inches Hg. When this temperature is reached, 80 parts methanol are added and the solution cooled. The varnish product so produced is clear and thermally cures to give a clear film on a heated steel surface.

EXAMPLE 11'

The procedure of example 10' is repeated except that here the diene codimer compound mixture comprises, when in a form substantially free of other materials wherein the sum of all component compounds of any given such mixture equals substantially 100 weight percent, about 90 weight percent of dicyclopentadiene, about 8 weight percent of codimers of cyclopentadiene with butadiene and isoprene (50/50), and about 2 weight percent of 50/50 1-pentene and 1-hexene mix.

This diene codimer mixture additionally contains about 10 weight percent toluene as an inert diluent. The varnish product so produced is clear and thermally cures to give a clear film on a heated steel surface.

EXAMPLE 12'

The procedure of example 10' is repeated except that here the diene codimer mixture comprises, when in a form substantially free of other materials wherein the sum of all component compounds of any given such mixture equals substantially 100 weight percent, about 80 weight percent dicyclopentadiene, about 5 weight percent of codimers of cyclopentadiene with butadiene and isoprene (50/50), and about 15 weight percent of 50/50 1-pentene and 1-hexene mix. This diene codimer mixture additionally contains about 10 weight percent toluene as an inert diluent. The varnish product so produced is clear and thermally cures to give a clear film on a heated steel surface.

Examples of suitable substituted phenol mixtures made with another preferred starting mixture used in this invention and resoles made therefrom are given below:

EXAMPLE A''

To a stirred reaction vessel 100 parts of phenol and 0.5 part concentrated sulfuric acid are charged and the resulting mixture is heated to 125° C. Then 30 parts of a diene codimer mixture available commercially under the trade designation "Resin Former P" from the Hess Oil and Chemical Co. and having a composition as described above in table II are added to the phenol mixture over a 30-minute period, keeping the temperature between 125° and 135° C. After the addition, the mixture is held at 125° to 135° C. for 15 minutes. The product is a substituted phenol mixture.

EXAMPLES B''-I''

Using the procedure and raw materials described in example A'', additional substituted phenol mixtures are prepared, as shown on table VIII below.

TABLE VIII

| Ex. No. | Friedel-Crafts catalyst | Parts per 100 phenol | Diene codimer mixture, parts per 100 phenol | Reaction temperature, ° C. | Post reaction holding temperature, ° C. |
|---|---|---|---|---|---|
| B'' | H₂SO₄ | 0.5 | 20 | 125 | 20 |
| C'' | H₂SO₄ | 0.5 | 40 | 125 | 30 |
| D'' | H₂SO₄ | 0.5 | 50 | 125 | 60 |
| E'' | H₂SO₄ | 1.0 | 60 | 150 | 60 |
| F'' | BF₃-etherate | 0.5 | 20 | 60 | 15 |
| G'' | AlCl₃ | 1.0 | 60 | 150 | 60 |
| H'' | AlCl₃ | 1.0 | 30 | 125 | 15 |
| I'' | BF₃ etherate | 0.5 | 70 | 150 | 60 |

Examples of phenolic resin varnishes of this invention are illustrated below.

EXAMPLE 1''

To the substituted phenol mixture made in example A'' is added (per 100 parts of phenol) 2 parts triethylamine, 2 parts hexamethylene tetramine and 83 parts of 50 percent formalin. This mixture is heated to a 100° C. reflux for 55 minutes, then cooled to 50° C. to produce a resole resin which is then dehydrated to 60° C. and 26 inches Hg. When this temperature is reached, 80 parts methanol are added and the solution cooled. The varnish product so produced is clear and thermally cures to give a clear film on a heated steel surface.

EXAMPLE 2''

To the substituted phenol mixture made in example D'' is added (per 100 parts of phenol) 2 parts of triethylamine, 3 parts of hexamethylenetetramine and 60 parts of 50 percent formalin. The mixture is heated to a 100° C. reflux for 50 minutes, then cooled to 50° C. to produce a resole resin which is then dehydrated to 60° C. and 27 inches Hg. When this temperature is reached, 70 parts methanol and 10 parts methyl ethyl ketone are added. A clear varnish product is thus obtained which thermally cures to give a clear film on a heated steel surface.

EXAMPLES 3''-9''

Examples of other varnishes of this invention are summarized in table IX. Preparation procedure for each is as given in example 1'. In each instance, a clear varnish is obtained which thermally cures to give a clear film.

TABLE IX

| Ex. No. | Substituted Phenol, Ex. No. | Resole Preparation Method, Ex. No. |
|---|---|---|
| 3'' | B'' | 1 |
| 4 | C'' | 2 |
| 5 | E'' | 2 |
| 6 | F'' | 1 |
| 7 | G'' | 2 |
| 8 | H'' | 1 |

EXAMPLE 10

To a stirred reaction vessel 100 parts of phenol and 0.5 part concentrated sulfuric acid are charged and the resulting mixture is heated to about 125° C. Then 30 parts of a diene codimer mixture are added to the phenol mixture over a 30-minute period, keeping the temperature between 125° and 135° C. This diene codimer mixture comprises, when in a form substantially free of other materials wherein the sum of all component compounds of any given such mixture equals substantially 100 weight percent, about 5 percent by weight of indene, about 70 percent by weight of dicyclopentadiene, about 5 percent by weight of codimers of cyclopentadiene with butadiene and isoprene (50/50) and about 20 percent by weight styrene. This diene codimer mixture additionally contains about 10 weight percent toluene as an inert diluent. After the addition, the product mixture is held at 125° to 135° C. for about 15 minutes.

To this substituted phenol product mixture is then added (per 100 parts of phenol) 2 parts triethylamine, 2 parts by weight hexamethylenetetramine and 83 parts by weight of 50 percent formalin. This mixture is heated to a 100° C. reflux for about 55 minutes, then cooled to 50° C. to produce a resole resin which is then dehydrated under vacuum to 60° C. and 26 inches Hg. When this temperature is reached, 80 parts methanol are added and the solution cooled. The varnish product so produced is clear and thermally cures to give a clear film on a heated steel surface.

EXAMPLE 11''

The procedure of example 10'' is repeated except that here the diene codimer mixture comprises, when in a form substantially free of other materials wherein the sum of all component compounds of any given such mixture equals substantially 100 weight percent, about 10 percent by weight of indene, about 50 percent by weight of dicyclopentadiene, about 10 percent by weight of codimers of cyclopentadiene with butadiene and isoprene (50/50) and about 30 percent by weight styrene. This diene codimer mixture additionally contains about 10 weight percent toluene as an inert diluent. The varnish product so produced is clear and thermally cures to give a clear film on a heated steel surface.

EXAMPLE 12''

The procedure of example 10'' is repeated except that here the diene codimer mixture comprises, when in a form substantially free of other materials wherein the sum of all component compounds of any given such mixture equals substantially 100 weight percent, about 5 percent by weight by weight of codimers of cyclopentadiene with butadiene and isoprene, (50/50), and about 6 percent by weight of styrene. This diene codimer mixture additionally contains about 10 weight percent toluene as an inert diluent. The varnish product so produced is clear and thermally cures to give a clear film on a heated steel surface.

Examples of suitable substituted phenol mixtures made with another preferred starting mixture used in this invention and resoles made therefrom are given below:

EXAMPLE A'''

To a stirred reaction vessel 100 parts of phenol and 0.5 part concentrated sulfuric acid are charged and the resulting mixture is heated to 125° C. Then 25 parts of a cyclopentadiene codimer compound mixture available commercially from Eastman Chemical Company under the trade designation "-Dicyclopentadiene" and having a composition as described in table III above are added to the phenol mixture over a 30-minute period, keeping the temperature between 125° and 135° C. After the addition, the mixture temperature is held at 125° to 135° C. for 15 minutes. The product is a substituted phenol mixture.

EXAMPLES B'''-J'''

Using the procedure and raw materials described in example A''' additional substituted phenol mixtures are prepared, as shown in table X below:

TABLE X

| Example No. | Friedel-Crafts catalyst | Parts per 100 phenol | Cyclopentadiene compound mixture, parts per 100 phenol | Reaction temp. | Post reaction holding period, min. |
|---|---|---|---|---|---|
| B''' | H₂SO₄ | 0.5 | 35 | 125 | 15 |
| C''' | H₂SO₄ | 0.5 | 45 | 125 | 15 |
| D''' | H₂SO₄ | 0.5 | 55 | 125 | 35 |
| E''' | H₂SO₄ | 0.5 | 65 | 150 | 180 |
| F''' | H₂SO₄ | 0.5 | 75 | 150 | 180 |
| G''' | H₂SO₄ | 2.0 | 100 | 150–160 | 240 |
| H''' | H₂SO₄ | 1.0 | 20 | 75 | 180 |
| I''' | AlCl₃ | 2.0 | 45 | 150 | 30 |
| J''' | BF₃-etherate | 0.5 | 44 | 75 | 240 |

Examples of phenolic resole resin varnishes of this invention are illustrated below. The substituted phenol-formaldehyde resole resin produced as described and employed in each varnish product has a formaldehyde to phenol ratio of from about 0.9 to 1.5. Each is produced by reacting in the presence of an organic basic catalyst under liquid aqueous phase conditions a substituted phenol mixture with formaldehyde. Each is substantially water insoluble, but has a methanol solubility such that a 60 weight percent solution thereof can be prepared in methanol. Each such methanol solution characteristically has a viscosity in the range from about 50 to 500 centipoises. Each resin has a free formaldehyde content which is less than about 5 weight percent. Each of the product varnishes is suitable for use in impregnating cellulosic substrates.

EXAMPLE 1'''

To the substituted phenol mixture made in example A''' is added (per 100 parts of phenol) 2 parts triethylamine, 2 parts hexamethylenetetramine and 83 parts of 50 percent formalin. This mixture is heated to a 100° C. reflux for 1 hour, then cooled to 50° C. to produce a resole resin which is then dehydrated to 70° C. and 26 inches Hg. When this temperature is reached, 80 parts methanol are added and the solution cooled. The product varnish is clear and thermally cures to give a clear film on a heated steel surface. The varnish has 61 percent solids and an Ostwald viscosity of 123 centipoises.

EXAMPLE 2'''

To the substituted phenol mixture made in example J''' is added (per 100 parts of phenol) 2 parts of triethylamine, 3 parts of hexamethylenetetramine and 60 parts of 50 percent formalin. The mixture is heated to a 100° C. reflux for 50 minutes, then cooled to 50° C. to produce a resole resin which is then dehydrated to 60° C. and 27 inches Hg. When this temperature is reached, 70 parts methanol and 10 parts methyl ethyl ketone are added. A clear varnish is obtained which thermally cures to give a clear film on a heated steel surface.

EXAMPLES 3'''–10'''

Examples of other varnishes of this invention are summarized in table XI. Preparative procedures used are as shown in this table. In each instance, a clear varnish is obtained which thermally cures to give a clear film.

TABLE XI

| Ex. No. | Substituted phenol, Ex. No. | Resole preparation method, Ex. No. | Methylolation catalyst, parts per 100 phenol |
|---|---|---|---|
| 3''' | B''' | 1''' | As in Example 1'''. |
| 4''' | C''' | 2''' | As in Example 2'''. |
| 5''' | D''' | 2''' | Do. |
| 6''' | E''' | 2''' | Do. |
| 7''' | F''' | 2''' | Do. |
| 8''' | G''' | 2''' | As in Example 2''', plus 2 parts triethylamine. |
| 9''' | H''' | 1''' | As in Example 1''', plus 1 part triethylamine. |
| 10''' | I''' | 2''' | Do. |

EXAMPLE 11'''

To a stirred reaction vessel 100 parts of phenol and 0.5 part concentrated sulfuric acid are charged and the resulting mixture is heated to about 125° C. Then 30 parts of a diene codimer mixture are added to the phenol mixture over a 30-minute period, keeping the temperature between 125° and 135° C. This diene codimer mixture is a cyclopentadiene codimer compound mixture available commercially from Union Carbide Company under the trade designation "-Dicyclopentadiene" and having a composition as described in table XI above. After the addition, the product mixture is held at 125° to 135° C. for about 15 minutes.

To this substituted phenol product mixture is then added (per 100 parts of phenol) 2 parts triethylamine, 2 parts by weight hexamethylenetetramine and 83 parts by weight of 50 percent formalin. This mixture is heated to a 100° C. reflux for about 55 minutes, then cooled to 50° C. to produce a resole resin which is then dehydrated under vacuum to 60° C. and 26-inches Hg. When this temperature is reached, 80-parts methanol are added and the solution cooled. The varnish product so produced is clear and thermally cures to give a clear film on a heated steel surface.

EXAMPLE 12'''

The procedure of example 11''' is repeated except that here the diene codimer mixture comprises, when in a form substantially free of other materials wherein the sum of all component compounds of any given such mixture equals substantially 100 weight percent, about 91 weight percent dicyclopentadiene, about 5 weight percent of codimers of cyclopentadiene with butadiene and isoprene (50/50), and about 4 weight percent of a codimer of cyclopentadiene with a methyl cyclopentadiene.

This diene codimer mixture additionally contains about 10 weight percent toluene as an inert diluent. The varnish product so produced is clear and thermally cures to give a clear film on a heated steel surface.

Examples of impregnated cellulosic sheet members made with the resole varnish of this invention are as follows:

EXAMPLES 13–18

Preformed cellulosic substrate types are chosen as follows:
Type 1—Nonwoven cotton linters paper, about 10-mils thick.
Type 2—Nonwoven cellulose fiber paper containing 12 percent of a synthetic fiber (polyester) about 10-mils thick.

Both types have an ash content less than about 0.9 weight percent. Each such substrate type is impregnated with a resole resin varnish. The impregnation procedure for impregnating each above substrate is as follows: The cellulosic sheets about 10 inch square are each passed through a specified impregnating solution (varnish) diluted to a specified solids content, drawn through the nip region between a pair of squeeze rolls to remove excess resin and hung in an oven to dry at 105° C. for about 3–20 minutes for a time sufficient to also advance the resin but not gel it. The resin content of each sheet is about 15 to 20 weight percent. Thereafter, each impregnated sheet is examined and it is observed that it is foldable without cracking and is porous. Thereafter, the sheets are cured at 160° C. for 10 minutes. It is observed that each product sheet has good tensile strength and flexibility characteristics. Each sheet also has porosity characteristics making it useful as an oil filter. It is found that the sheets are stable in hot (above 135° C.) motor oil for indefinite periods of time.

Details concerning such impregnated cellulose sheets are shown in table XII.

TABLE XII

| | Treating solution | | Preformed cellulose substrate type | Resin content [1] |
|---|---|---|---|---|
| Ex. No. | Ex. No. | Solids content [1] | | |
| 13 | 4' | 20 | 2 | 22 |
| 14 | 5' | 18 | 1 | 20 |
| 15 | 5'' | 16 | 2 | 18 |
| 16 | 7'' | 20 | 2 | 20 |
| 17 | 5''' | 22 | 2 | 23 |
| 18 | 7''' | 22 | 2 | 25 |

[1] Total weight percent basis.

Examples of laminates made from the impregnated cellulosic sheets of this invention follows:

EXAMPLES 19-28

Preformed cellulosic substrate types are chosen as follows:
Type 1—Nonwoven cotton linters paper, about 10-mils thick.
Type 2—Nonwoven unbleached Kraft paper about 7-mils thick.
Type 3—Nonwoven α-cellulose paper about 10-mils thick.
Type 4—Nonwoven bleached Kraft paper about 15-mils thick.
Type 5—Woven cotton duck about 8 oz. weight.
Type 6—Woven linen cloth about 4 oz. weight.

A resole varnish is used to impregnate sheets of preformed cellulosic substrates having dimensions of about 9×12 inches and an ash content under about 0.5 weight percent using the impregnating procedure of examples 13 to 19 to produce sheets having a resin content of about 50–60 weight percent. Each impregnated sheet is heated in a 135° C. oven for about 5 to 20 minutes until it has a flow of about 4 to 15 percent. Thereafter the sheets so impregnated with each varnish are stacked together in a deck and laminated together by placing the so-formed deck under pressure between opposing faces of about 1,000 p.s.i. using a temperature of about 150° C. for about 30 minutes. A laminate is thus produced in each instance having excellent tensile strength and flexibility characteristics. Except for laminate made from varnishes 8', 8'' and 10''' the laminates have good electrical (dielectric constants and dissipation factors) properties. Details concerning such impregnated cellulose sheets are shown in table XIII.

TABLE XIII

| Ex. No. | Treating solution Ex. No. | Solids content[1] | Preformed substrate type | Resin content[1] | No. of sheets |
|---|---|---|---|---|---|
| 19 | 3' | 60 | 1 | 58 | 8 |
| 20 | 3' | 60 | 2 | 62 | 10 |
| 21 | 3' | 60 | 3 | 61 | 8 |
| 22 | 3' | 60 | 4 | 60 | 6 |
| 23 | 3' | 60 | 5 | 55 | 4 |
| 24 | 3' | 60 | 6 | 56 | 5 |
| 25 | 2'' | 60 | 1 | 60 | 8 |
| 26 | 3'' | 60 | 1 | 62 | 8 |
| 27 | 3''' | 60 | 1 | 59 | 8 |
| 28 | 6''' | 60 | 1 | 59 | 8 |

[1] Weight percent basis.

The product impregnated substrates have good electrical and mechanical properties.

What is claimed is:

1. A resin-impregnated form comprising:
A. a substrate member in sheetlike form comprising at least 50 weight percent cellulosic fibers with the balance up to 100 weight percent of any given such member being a synthetic organic polymeric fibrous material,
B. said substrate member being impregnated with from about 5 to 70 weight percent (based on total weight basis) of a substituted phenol-formaldehyde resole resin,
C. said resole resin being characterized by:
  1. having a formaldehyde to phenol mol ratio of from about 0.8 to 2.0,
  2. being produced by reacting under a aqueous liquid phase conditions formaldehyde and a substituted phenol mixture in the presence of a basic catalyst,
  3. being substantially insoluble in water but having a viscosity in methanol solution at 60 weight percent solids concentration of not greater than about 5,000 centipoises, and
  4. having a free-formaldehyde content which is less than about 5 weight percent,
D. said substituted phenol mixture having been prepared by reacting phenol under Friedel-Crafts conditions with from about 10 to 100 parts by weight for each 100 parts by weight of said phenol of a mixture of cyclopentadiene dimers,
E. said mixture of cyclopentadiene dimers comprising (when in a form substantially free of other materials wherein the sum of all component compounds in any given such mixture equals substantially 100 weight percent):
  1. from about 50 to 99 weight percent of compounds each molecule of which has:
    a. the dicyclopentadiene nucleus
    b. from 10 through 13 carbon atoms
    c. as nuclear substituents from zero through three methyl group, and
  2. from about 1 to 50 weight percent of compounds each molecule of which is a codimer of cyclopentadiene with at least one acyclic conjugated alkadiene having from four through six carbon atoms per molecule.

2. The product of claim 1 wherein said mixture of cyclopentadiene dimers (same basis) comprises:
A. from about 70 to 90 weight percent of dicyclopentadiene
B. from about 10 to 30 weight percent of compounds each molecule of which is a codimer of cyclopentadiene with at least one acyclic conjugated alkadiene having from four through six carbon atoms per molecule, and
C. from about 2 to 15 weight percent of compounds each molecule of which is a cyclic and/or an acyclic conjugated alkadiene having five or six carbons atoms per molecule.

3. The product of the claim 1 wherein said mixture of cyclopentadiene dimers (same basis) comprises:
A''. from about 1.5 to 10 weight percent of compounds each molecule of which has:
  1. the the indene nucleus
  2. from 9 through 13 carbon atoms
  3. as nuclear substituents from zero through four methyl groups
B''. from about 50 to 70 weight percent of compounds each molecule of which has
  1. the dicyclopentadiene nucleus
  2. from about 10 through 13 carbon atoms
  3. as nuclear substituents from zero through three methyl groups,
C''. from about 4 to 10 weight percent of compounds each molecule of which is a codimer of cyclopentadiene with at least one acyclic conjugated alkadiene having from four through six carbon atoms per molecule, and
D''. from about 4 to 30 percent of compounds each molecule of which has:
  1. a phenyl group substituted by a vinylidene group,
  2. from eight through 13 carbon atoms
  3. as substituents from zero through three groups selected from the class consisting of methyl and ethyl.

4. The product of claim 1 wherein said mixture of cyclopentadiene dimers—same basis comprises:
A'''. from about 92 to 97 weight percent of dicyclopentadiene,
B'''. from about 1 to 5 weight percent of compounds each molecule of which is a codimer of cyclopentadiene with at least one acyclic conjugated alkadiene having from four through six carbon atoms per molecule, and
C'''. from about 1 to 4 weight percent of compounds each molecule of which is a codimer of cyclopentadiene with a methylcyclopentadiene, provided that the sum of (A''') and (C''') in any given such cyclopentadiene dimer mixture is always at least about 95 weight percent thereof—same basis.

5. The product of claim 1 wherein said resole resin is made by reacting said phenol and said mixture of carbocyclic compounds in the presence of an inert hydrocarbon such that, of the combined weight of said mixture of carbocyclic compound and said inert hydrocarbon, the inert hydrocarbon portion thereof ranges from about 15 to 70 weight percent thereof.

6. The product of claim 1 wherein said substrate member is composed substantially of cellulose.

7. The product of claim 1 wherein said substrate member has an ash content under 0.5 weight percent.

8. A product of claim 1 which has a volatile level of less than about 8 percent by weight.

9. A product of claim 1 which is advanced to an extent such that it has a flow of from about 3 to 20 percent.

10. A product of claim 1 which is less than about 10 mils in thickness.

11. A product of claim 1 which is substantially completely thermoset.

* * * * *